United States Patent
Park et al.

(10) Patent No.: US 10,400,424 B2
(45) Date of Patent: Sep. 3, 2019

(54) JOYSTICK LEVER ASSEMBLY

(71) Applicant: DAEDONG INDUSTRIAL CO., LTD., Daegu (KR)

(72) Inventors: Jin Mok Park, Gyeongsangnam-do (KR); Hee Jin Park, Gyeongsangnam-do (KR); Ki Ho Park, Gyeongsangnam-do (KR); Bo Gun Seo, Gyeongsangnam-do (KR)

(73) Assignee: DAEDONG INDUSTRIAL CO., LTD., Daegu (KR)

( * ) Notice: Subject to any disclaimer, the term of this patent is extended or adjusted under 35 U.S.C. 154(b) by 98 days.

(21) Appl. No.: 15/496,272

(22) Filed: Apr. 25, 2017

(65) Prior Publication Data

US 2017/0314231 A1     Nov. 2, 2017

(30) Foreign Application Priority Data

Apr. 28, 2016  (KR) .................... 10-2016-0052427

(51) Int. Cl.

| | |
|---|---|
| *E02F 9/20* | (2006.01) |
| *G05G 1/04* | (2006.01) |
| *G05G 5/00* | (2006.01) |
| *F16K 31/60* | (2006.01) |
| *G05G 9/047* | (2006.01) |

(52) U.S. Cl.
CPC .......... *E02F 9/2004* (2013.01); *F16K 31/602* (2013.01); *G05G 1/04* (2013.01); *G05G 5/005* (2013.01); *G05G 9/047* (2013.01)

(58) Field of Classification Search
None
See application file for complete search history.

(56) References Cited

U.S. PATENT DOCUMENTS

| | | | |
|---|---|---|---|
| 7,320,263 B2 * | 1/2008 | Gustafsson | G05G 5/28 74/471 XY |
| 2010/0006789 A1 * | 1/2010 | Maezawa | E02F 9/2267 251/98 |
| 2014/0230936 A1 | 8/2014 | Naitou | |

FOREIGN PATENT DOCUMENTS

| | | |
|---|---|---|
| KR | 10-2014-0130829 A | 11/2014 |
| KR | 10-1494402 B1 | 2/2015 |

OTHER PUBLICATIONS

Office Action dated Jan. 16, 2018 for Australian Patent Application No. 2017202796.

* cited by examiner

*Primary Examiner* — Jessica Cahill
*Assistant Examiner* — Daphne M Barry
(74) *Attorney, Agent, or Firm* — LRK Patent Law Firm

(57) ABSTRACT

A joystick lever assembly includes: a base part; an operation part that is mounted on a first side plate of the base part and has rotary elements rotated with respect to each of forward, backward, leftward, and rightward directions by a joystick lever; a first connector connected to one side of the operation part; a second connector connected to a central part of the operation part; a lock part including a lock lever unit that is mounted on the second side plate of the base part and performs a rotary motion in a forward/backward direction, and a lock member that performs a rectilinear motion in a rotary direction of the lock lever on the floor plate according to the rotary motion of the lock lever unit; and a first stopper and a second stopper coupled to the bottoms of the first connector and the second connector.

10 Claims, 9 Drawing Sheets

Cross-section taken along line A-A

JOYSTICK LEVER ASSEMBLY

CROSS REFERENCE TO RELATED APPLICATION

The present application claims priority to Korean Patent Application No. 10-2016-0052427, filed Apr. 28, 2016, the entire content of which is incorporated herein for all purposes by this reference.

BACKGROUND OF THE INVENTION

1. Field of the Invention

The present invention relates to a joystick lever assembly. More particularly, it relates to a joystick lever assembly that enables the simultaneous or separate operation of two independent hydraulic valves.

2. Description of Related Art

Generally, various types of work machines operated by oil pressure can be attached to an agricultural work vehicle, such as a tractor. Among such work machines, a front loader may be attached for loading or moving earth, sand, aggregate, etc. onto a transportation machine or to another place. In regards to this, the ascent/descent of the front loader and the angle adjustment of a bucket are realized by a joystick lever assembly provided near a driver's seat.

A joystick lever assembly conventionally applied to an agricultural work vehicle is composed of a base part 100, an operation part 200, a lock part 300, and connectors 410 and 420 as shown in FIG. 1. Accordingly, the first connector 410 and the second connector 420 are simultaneously or separately moved by a forward, backward, leftward or rightward tilting motion of the operation part 200 through a lever 500 such that opening states and flowing states of two hydraulic valves with different functions can be switched simultaneously or separately.

For instance, an opening state or a flowing state of a hydraulic valve for adjusting an ascent/descent of a front loader from inside a vehicle body can be controlled through the first connector 410 by operating the lever 500 forward and backward. In addition, an opening state or a flowing state of a hydraulic valve for adjusting a bucket angle of the front loader can be controlled through the second connector 420 by operating the lever 500 leftward or rightward.

Naturally, operation with respect to all diagonal directions is practicable through both forward/backward operation and leftward/rightward operation of the lever. In this case, opening and flowing states of the two hydraulic valves can simultaneously be controlled. In other words, since a hydraulic valve for an ascending/descending cylinder and a hydraulic cylinder for a bucket cylinder can be simultaneously driven by operating the lever in diagonal directions, the ascent/descent of the loader and the angle adjustment of the bucket can be simultaneously realized.

The operation part 200 is tillable with respect to a biaxial direction (a forward/backward direction and a leftward/rightward direction), and is connected to the lever 500 into which operation force is input. In addition, the lock part 300 is configured to restrict or release the movement of the operation part 200 by rotating a lock lever 310, thereby preventing the unintended operation of the lever due to a mistake or inattention during operating or idling of the vehicle.

According to a conventional construction, as illustrated in FIG. 1 or a side view of FIG. 2 in which a main part is enlarged, the lock part 300 is configured to restrict or release the movement of a joystick lever by binding the lock bar 320 to the operation part 200 or releasing the binding state by pushing or pulling the lock lever 310.

More particularly, when rotating the lock bar 320 toward the operation part 200 to be tightly attached thereto, a binding hole 322 formed on the lock bar 320 engages with a protrusion 222 on a bottom surface part of the operation part 200 to restrict the movement of the operation part 200.

According to the conventional technique, however, since the binding hole 322 does not tightly engage with the protrusion 222, there is a gap therebetween even in a locked state due to the machining tolerance between the binding hole 322 and the protrusion 222. In other words, there was a problem in the conventional art that a work machine is operated because a cylinder is slightly driven when a joystick lever in a locked state is slightly moved.

SUMMARY OF THE INVENTION

The present invention is intended to propose a joystick lever assembly that can minimize a gap of a joystick lever in a locked state.

In order to achieve the above object, according to one aspect of the present invention, there is provided a joystick lever assembly that enables the simultaneous or separate operation of two independent hydraulic valves, the joystick lever assembly including: a base part including a floor plate, a first side plate vertically connected to the floor plate, and a second side plate vertically connected to the other side part of the floor and perpendicularly connected to the first side plate; an operation part that is connected to the first side plate of the base part and has rotary elements rotated forward, backward, leftward, and rightward by a joystick lever, and to which the joystick lever is connected; a first connector connected to one side of the operation part so as to transfer forward/backward rotation operating force of the operation part to an operation terminal of one hydraulic valve; a second connector connected to a central part of the operation part so as to transfer leftward/rightward rotation operating force of the operation part to an operation terminal of the other hydraulic valve; a lock part including a lock lever unit that is mounted on the second side plate of the base part and performs a rotary motion in a forward/backward direction, and a lock member that performs a rectilinear motion in a rotary direction of the lock lever on the floor plate according to the rotary motion of the lock lever unit; and a first stopper and a second stopper coupled to the bottoms of the first connector and the second connector, respectively, toward the lock member, wherein a first fixing groove and a second fixing groove that is in a slit form whose one side is opened are provided to correspond to the first and second stoppers, respectively, wherein the first stopper and the second stopper are inserted into the first fixing groove and the second fixing groove according to the rectilinear motion of the lock member so as to restrict the movement of the operation part in a biaxial direction.

According to the present invention, the operation part may include: a forward/backward tilting bracket mounted on the first side plate to be rotatable in a forward/backward direction, wherein one end of the first connector is hingedly coupled to one end part; and a leftward/rightward tilting shaft hingedly coupled to the forward/backward tilting bracket so as to be rotated in a leftward/rightward direction, wherein a connection shaft to which the joystick lever is connected and an operation shaft to which one end of the second connector is ball-jointed are provided on an external surface part.

In regards to this, a concave mounting part whose size corresponds to that of the leftward/rightward tilting shaft may be provided on the forward/backward tilting bracket, and the leftward/rightward tilting shaft may be hingedly coupled to the concave mounting part to be rotatable in a leftward/rightward direction.

In addition, the lock lever unit and the lock member of the lock part may be connected by a pin, and an elongated hole into which the pin is inserted may be provided on one side of the lock member to correspond to the pin moved along a specific circular arc trace by the rotary motion of the lock lever unit.

Moreover, the lock lever unit may include: a lock lever bracket mounted on the second side plate of the base part; a lock lever, wherein a handle grip is provided on the top, and a hinge shaft connected to the lock lever bracket is provided on the bottom; and an operation rod which is attached to the hinge shaft of the lock lever and is connected to the lock member by being extended in a direction toward the lock member.

Furthermore, the joystick lever assembly may further include: a guide member that is coupled to a front end of the lock member, and is inserted into a guide hole formed on the second side plate of the base part to guide the rectilinear motion of the lock member.

Also, the joystick lever assembly may further include: a friction reducing plate provided between the lock member and the floor plate of the base part.

In regards to this, at least one side surface supporting plate may be provided on the friction reducing plate to face a part of one side surface of the lock member, a slot may be provided on one side of the lock member to correspond to the side surface supporting plate, and the rectilinear motion of the lock member may stably be performed with respect to the friction reducing plate by a guide pin that is coupled to the side surface supporting plate and is inserted into the slot.

According to a joystick lever assembly of the present invention, a lock member, which performs a rectilinear motion by a lock lever, can completely limit the bidirectional movement of an operation part by simultaneously restricting two connectors that transfer the forward, backward, leftward, and rightward rotation operating force of a lever to hydraulic valves. In other words, since the forward, backward, leftward, and rightward movements of the operation part are simultaneously restricted, locking can be more stably and completely realized.

Unlike a conventional structure in which the forward/backward movement is also limited by using a lock bar to restrict a leftward/rightward rotation shaft of an operation part, so a locked state is not stable, and a gap is generated due to the tolerance between a binding hole and a protrusion, the present invention is advantageous in that since each of the forward, backward, leftward, and rightward movements of an operation part is separately restricted by one lock member at the same time, the generation of a gap can be minimized in a locked state.

DETAILED DESCRIPTION OF THE INVENTION

Figure 1:
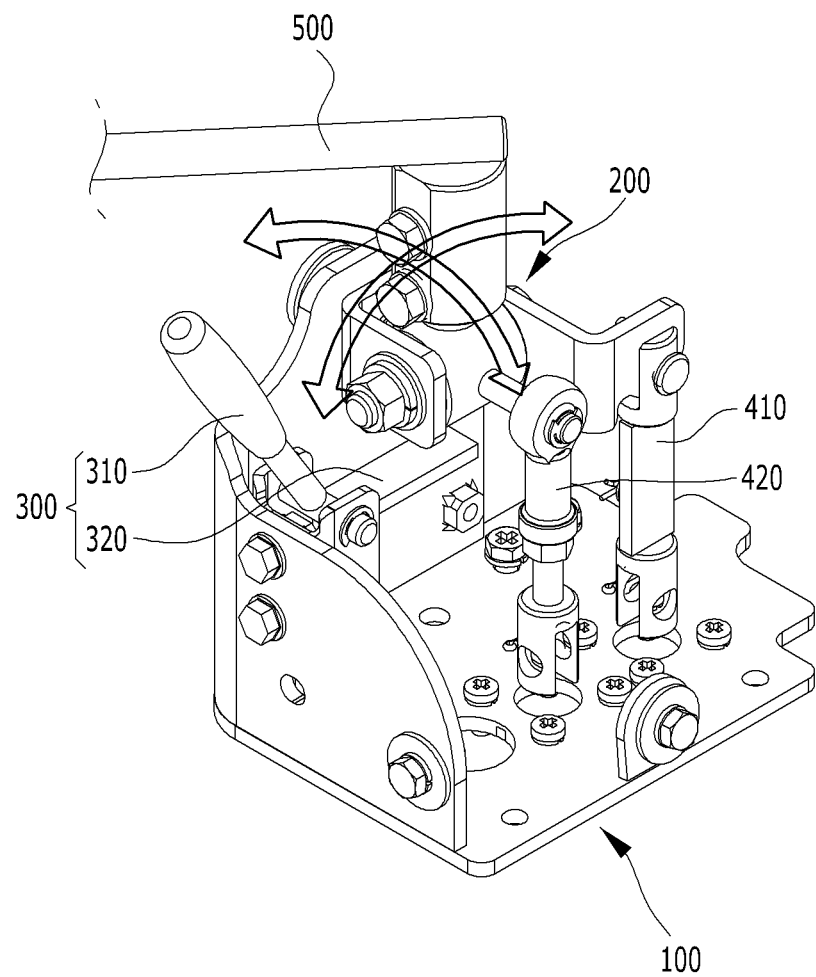
FIG. 1 is a perspective view of a joystick lever assembly according to conventional technique.
Figure 2:
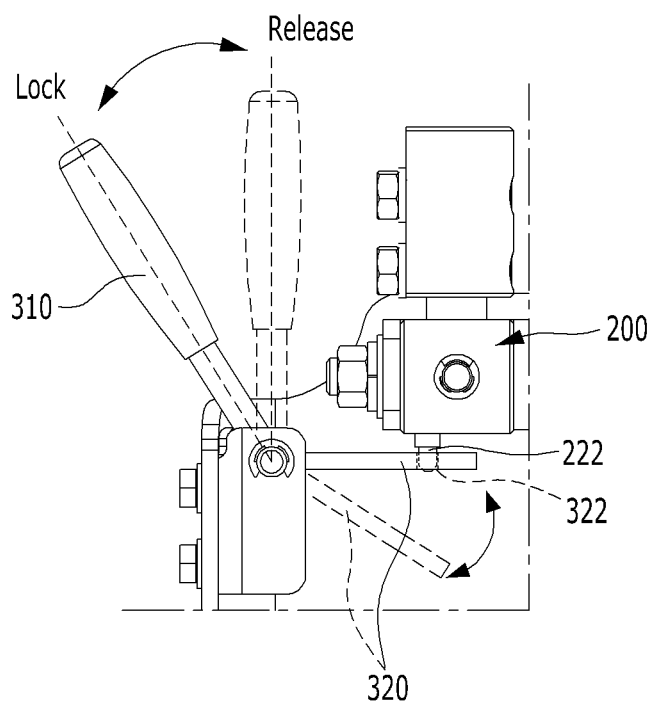
FIG. 2 is a side view in which a main part of the conventional joystick lever assembly of FIG. 1 is enlarged.

Hereinafter, a preferred embodiment of the present invention will be described in detail.

Terms mentioned in the specification are only used for describing a specific embodiment, but are not intended to limit the present invention. An expression in a singular form also includes an expression in a plural form unless the expression in a singular form obviously has a different meaning. Terms such as "include", "have", etc. are only intended to designate the existence of features, numbers, steps, motions, elements, components, or combinations thereof described in the specification, but are not intended to exclude the existence or the additional possibility of one or more features, numbers, steps, motions, elements, components, or combinations thereof in advance.

In addition, terms such as first, second, etc. may be used for describing various elements, but the elements should not be limited by the terms. The terms are only used for distinguishing one element from another element.

Also, terms described in the specification, such as " . . . part", " . . . unit", " . . . module", etc. mean a unit for processing at least one function or motion, and may be realized by hardware or software and a combination thereof.

In the following description of the present invention with reference to the accompanying drawings, the same reference numerals will be assigned with respect to the same elements, and repeated descriptions about these points will be omitted. In addition, in the following description of the present invention, detailed descriptions of known constructions will be omitted if they make the subject matter of the present invention unclear.

Figure 3:
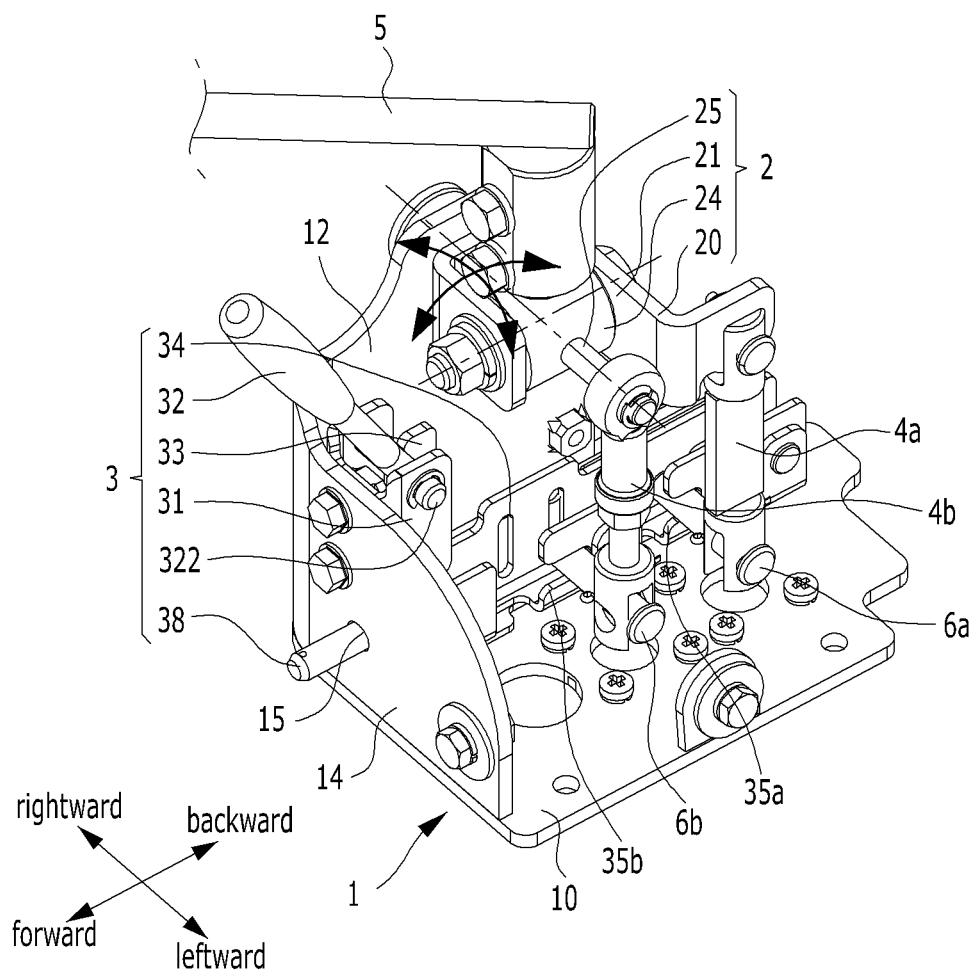
FIG. 3 is a perspective view of a joystick lever assembly according to the present invention.

Prior to the following description of the present invention, among terms with respect to directions, a forward/backward direction is defined as a rotation direction of a lock lever based on FIG. 3, and a leftward/rightward direction is defined as a direction horizontally orthogonal to the rotation direction of the lock lever.

Figure 4:
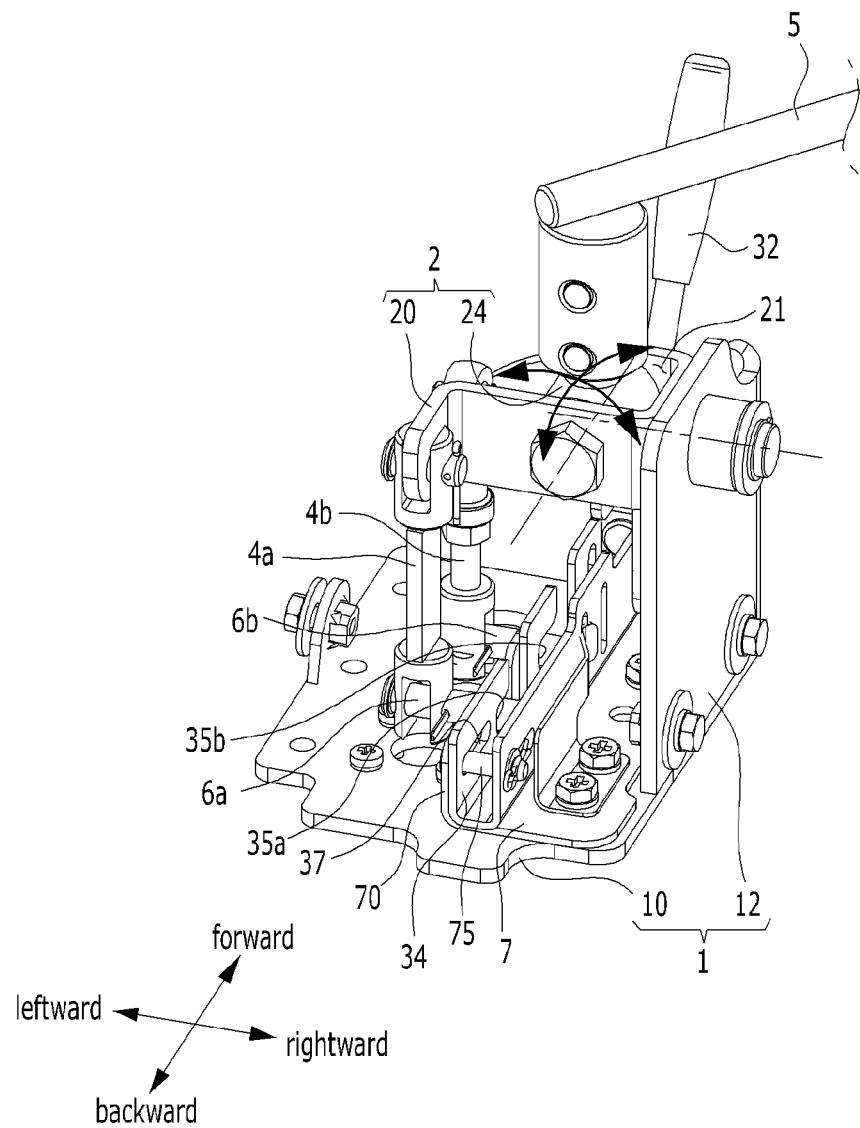
FIG. 4 is a perspective view of the joystick lever assembly according to the present invention, which is shown from a different angle.

FIG. 3 is a perspective view of a joystick lever assembly according to the present invention, and FIG. 4 is a perspective view of the joystick lever assembly according to the present invention, which is shown from a different angle. In addition, FIGS. 5 and 6 are a side view and a plan view of the joystick lever assembly illustrated in FIG. 3.

With reference to FIGS. 3 to 6, the joystick lever assembly according to the embodiment is a lever assembly operable with respect to not only forward, backward, leftward, and rightward directions but also all diagonal directions between the forward, backward, leftward, and rightward directions so as to enable the simultaneous or separate operation of two hydraulic valves, and includes a base part 1; an operation part 2; a first connector 4a and a second connector 4b; a lock part 3; and a first stopper 6a and a second stopper 6b.

Figure 5:
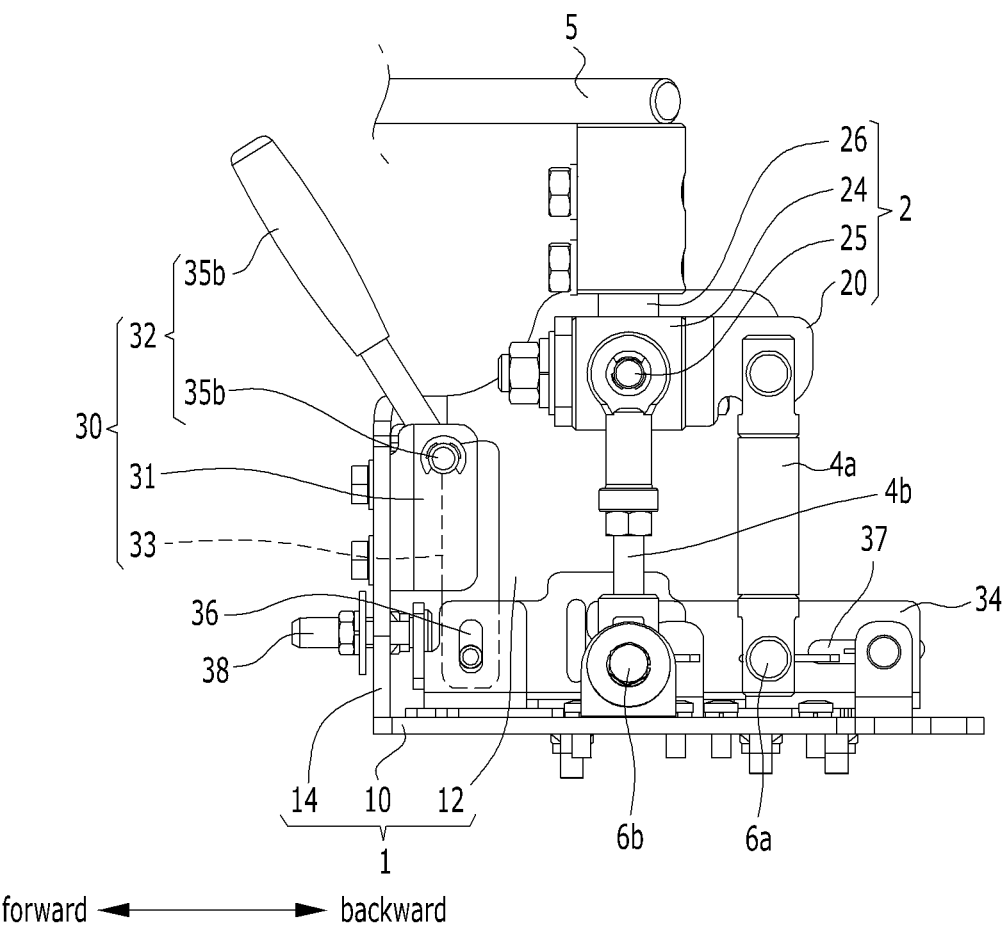
FIG. 5 is a side view of the joystick lever assembly illustrated in FIG. 3.
Figure 6:
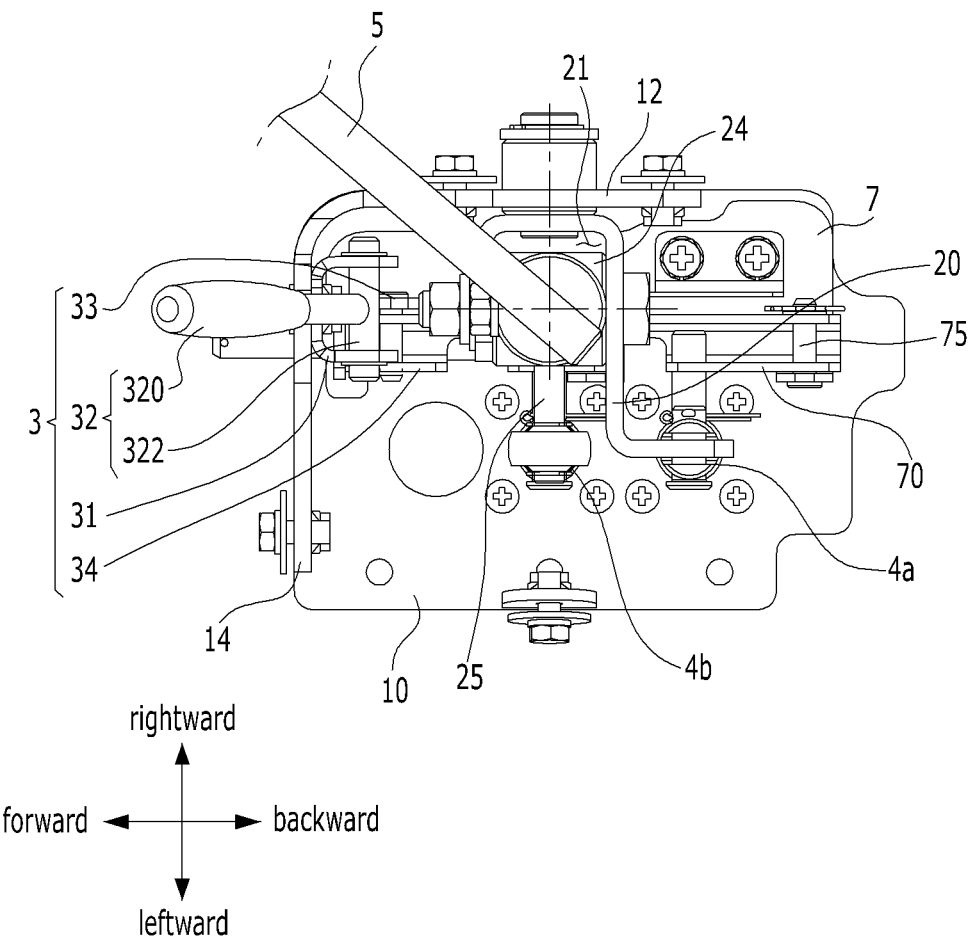
FIG. 6 is a plan view of the joystick lever assembly illustrated in FIG. 3.

In other words, as illustrated in FIGS. 3 to 5, the joystick lever assembly is composed of the base part 1; the operation part 2; the lock part 3; the two connectors 4a and 4b; and the two stoppers 6a and 6b. Accordingly, the first connector 4a and the second connector 4b are simultaneously or separately moved by at least one of the forward, backward, leftward, and rightward tilting motions of the operation part 2 through a joystick lever 5 such that opening states and flowing states of two hydraulic valves with different functions can be simultaneously or separately switched.

For instance, when the joystick lever 5 is operated forward and backward, the operation part 2 rotates forward and backward and the first connector 4a ascends and descends, so an opening state or a flowing state of a hydraulic valve for adjusting an ascent/descent can be controlled by being involved in the operation of an ascending/descending cylinder of a front loader. In addition, the operation part 2 rotates leftward and rightward when the lever 5 is operated in the same direction, so an opening state or a flowing state of a hydraulic valve for adjusting a bucket angle can be controlled through the second connector 4b.

Naturally, lever operation with respect to all diagonal directions is practicable through both forward/backward operation and leftward/rightward operation of the joystick lever 5. In this case, opening and flowing states of the two hydraulic valves with different functions can be simultaneously controlled. In other words, since a hydraulic valve for an ascending/descending cylinder and a hydraulic cylinder for a bucket cylinder can be simultaneously driven by operating the lever in diagonal directions, the ascent/descent of the loader and the angle adjustment of the bucket can be simultaneously realized.

Specifically described, the base part 1 includes a floor plate 10 and a first side plate 12 vertically connected to the floor plate 10, and further includes a second side plate 14 vertically connected to the other side part of the floor plate 10 and perpendicularly connected to the first side plate 12. In regards to this, the shapes and sizes of the floor plate 10, the first side plate 12, and the second side plate 14 are not specifically limited, and the thicknesses thereof and the height selections of the side plates are not specifically limited.

The operation part 2 is tiltable with respect to a biaxial direction (forward/backward direction and leftward/rightward direction), and is connected to the joystick lever 5 into which actual operation force is input. The operation part 2 is mounted on the first side plate 12 of the base part 1 to be rotatable, and has two rotary elements rotated forward, backward, leftward, and rightward by the joystick lever 5.

The two rotary elements may be a forward/backward tilting bracket 20 that rotates forward and backward within a predetermined range according to the forward/backward operation of the joystick lever 5, and a leftward/rightward tilting shaft 24 that rotates leftward and rightward within a predetermined range according to the leftward/rightward operation of the joystick lever 5. The forward/backward tilting bracket 20 is mounted on the first side plate 12 to be rotatable in a forward/backward direction, and the leftward/ rightward tilting shaft 24 is hingedly coupled to the forward/ backward tilting bracket 20 to be rotatable in a leftward/ rightward direction.

One end of the first connector 4a is hingedly coupled to one end of the forward/backward tilting bracket 20. The first connector 4a ascends and descends in vertical directions in cooperation of the forward/backward rotation of the forward/backward tilting bracket 20, and the other end thereof is directly or indirectly connected to an operation terminal of one hydraulic valve. Accordingly, the rotary force is transferred to the hydraulic valve via the first connector 4a when the forward/backward tilting bracket 20 rotates forward and backward by the joystick lever 5.

The leftward/rightward tilting shaft 24 is hingedly coupled to a concave mounting past 21 provided on the forward/backward tilting bracket 20 whose size corresponds to that of the leftward/rightward tilting shaft 24, so the leftward/rightward tilting shaft 24 is rotatable in a leftward/ rightward direction. A connection shaft 26 to which the joystick lever 5 is connected is provided on an upper side of an external surface part of the leftward/rightward tilting shaft 24, and an operation shaft 25 that outputs rotation operating force to the second connector 4b is provided on a side part of the external surface past.

One end of the second connector 4b may be connected to the operation shaft 25 by a ball joint, and the other end of the second connector 4b is directly or indirectly connected to an operation terminal of the other hydraulic valve. Accordingly, the second connector 4b ascends and descends by the forward/backward movement of the operation shaft 25 when the leftward/rightward tilting shaft 24 rotates leftward and rightward such that an opening state and a flowing state of the valve can be switched because the position of the operation terminal of the other hydraulic valve is changed.

The first connector 4a and the second connector 4b may be a rod-shaped structure whose cross-section is square or circular, and a first stopper 6a and a second stopper 6b are vertically coupled to the bottom of the connectors 4a and 4b, respectively. In regards to this, the first stopper 6a and the second stopper 6b are main elements involved in demonstrating a lock feature, are provided in leftward/rightward directions toward a lock member 34 that will be mentioned later, and are coupled to the lock member 34 according to a change in the position of the lock member 34.

More particularly, parts of the first stopper 6a and the second stopper 6b are inserted into a first fixing groove 35a and a second fixing groove 35a provided on the lock member to correspond to the first stopper 6a and the second stopper, respectively, so as to be bound thereto in a fixed form when a lock operation is performed, thereby restricting the movements of the stoppers 6a and 6b. Accordingly, ascending/descending of the first connector 4a and the second connector 4b are restricted, and the movement of the operation part 2 is consequentially restricted.

Figure 7:
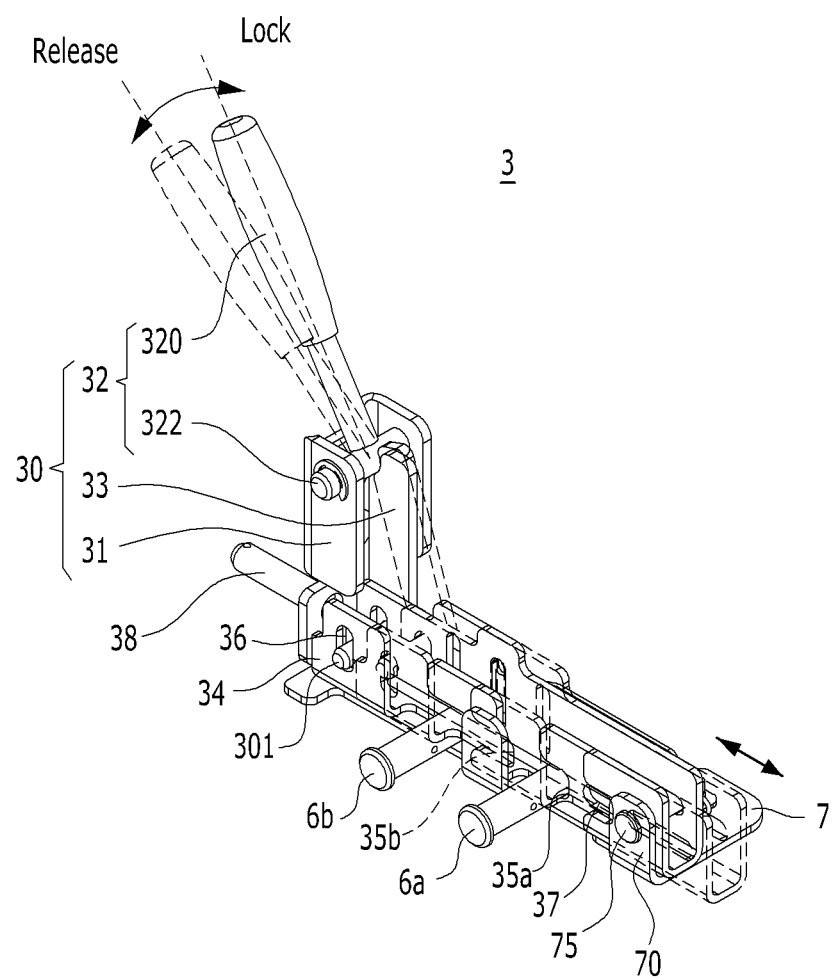
FIG. 7 is a perspective view illustrating an extracted main part of the joystick lever assembly according to the present invention.
Figure 8:
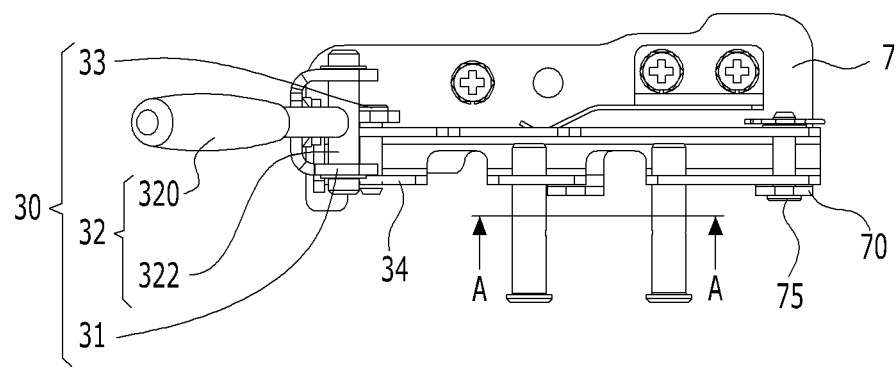
FIG. 8 is a plan view of FIG. 7.
Figure 9:
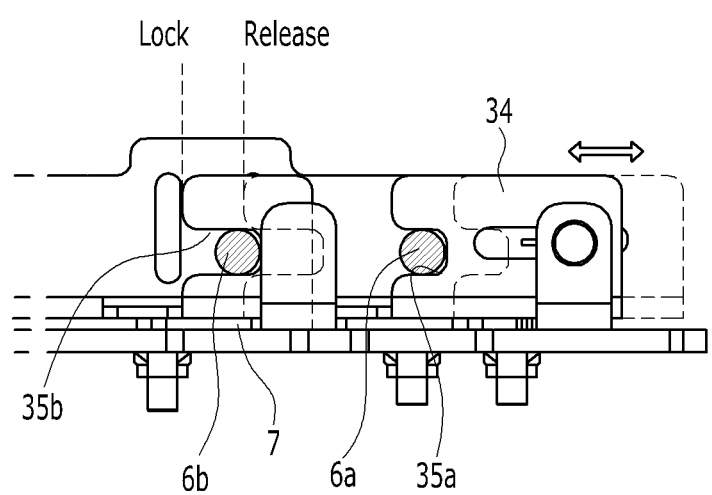
FIG. 9 is a cress-sectional view taken along line A-A of FIG. 8.

FIG. 7 is a perspective view illustrating an extracted main part of the joystick lever assembly according to the present invention, and FIG. 8 is a plan view of FIG. 7. Also, FIG. 9 is a cross-sectional view taken along line A-A of FIG. 8.

With reference to FIGS. 6 to 9, the lock part 3 is mainly composed of a lock lever unit 30 and the lock member 34. The lock lever unit 30 performs a rotary motion in a forward/backward direction by being mounted on the second side plate 14 (see FIG. 3), and one end of the lock member 34 is connected to the lock lever unit 30 on the floor plate 10, thereby performing a rectilinear motion on the floor plate 10 by being interlocked with the rotary motion of the lock lever unit 30.

The first fixing groove 35a and the second fixing groove 35b that is a slit form whose one side is open are provided on one side surface of the lock member 34 to correspond to the first and second stoppers 6a and 6b, respectively. Accordingly, end parts of the first stopper 6a and the second stopper 6b are inserted into the first fixing groove 35a and the second fixing groove 35b when the lock member 34 is moved to a locked position by the lock lever unit 30, thereby inhibiting the movement of the operation part 2 in a biaxial direction.

The lock member 34 is connected to the lock lever unit 30 to cooperate with each other by using a pin 301. In regards to this, the lock lever unit 30 is hingedly coupled to the second side plate 14 of the base part 1 to be able to perform rotary operation in forward/backward directions, and an elongated hole 36 to which the pin 301 is coupled is formed on one side of the lock member 34 to correspond to the pin moved along a specific circular arc trace by the rotary motion of the lock lever unit 30.

More particularly, the lock lever unit 30 includes a lock lever bracket 31 mounted on the second side plate 14 of the base part 1; and a lock lever 32, wherein a handle grip is provided on the top, and a hinge shaft 322 connected to the lock lever bracket 31 is provided on the bottom. In addition, the lock lever unit 30 further includes an operation rod 33 that is attached to the hinge shaft 322 of the lock lever 32 and is connected to the lock member 34 through the pin 301 by being extended to the side of the lock member 34.

The lock member 34 performs a rectilinear motion on the floor plate 10 by the rotation of the operation rod 33 around the hinge shaft 322 when the lock lever 32 is operated forward and backward (locking or releasing operation). Also, due to the rectilinear movement of the lock member 34, the first stopper 6a and the second stopper 6b are restricted to the lock member 34 or the restriction states thereof are released.

Since a guide member 38 assembled on the front end of the lock member 34 is moved along the guide hole 15 (see FIG. 3) formed on the second side plate 14 of the base part 1 when the lock member 34 moves, the rectilinear motion of the lock member can stably be performed. In addition, a friction reducing plate 7 is intervened between the lock member 34 and the floor plate 10 of the base part to prevent direct contact between the lock member 34 and the floor plate 10 and to realize smooth sliding of the lock member 34.

The friction reducing plate 7 is a plate-shaped structure made of metal or non-metal, and may be a construction where a lubricant is applied to a surface contacting with the lock member 34, or may be a construction where a coating layer with thin film thickness is formed on the surface through a predetermined surface treatment. In addition, at least one side surface supporting plate 70, which covers a part of one side surface of the lock member 34 such that the lock member 34 can stably moved without a leftward/rightward gap, may be provided on one side of the friction reducing plate 7.

A slot 37 is provided on a side surface part of the lock member 34 that faces or contacts with the side surface supporting plate 70 to correspond thereto. In addition, by virtue of a guide pin 75 inserted into the slot 37 by passing through the side surface supporting plate 70, the rectilinear motion of the lock member 34 is stably performed on the friction reducing plate 7, and a stable coupling structure where the lock member 34 is not separated from the friction reducing plate 7 is realized.

The lock operation of the joystick lever assembly with the aforementioned construction according to the present invention will be mentioned.

Figure 10:
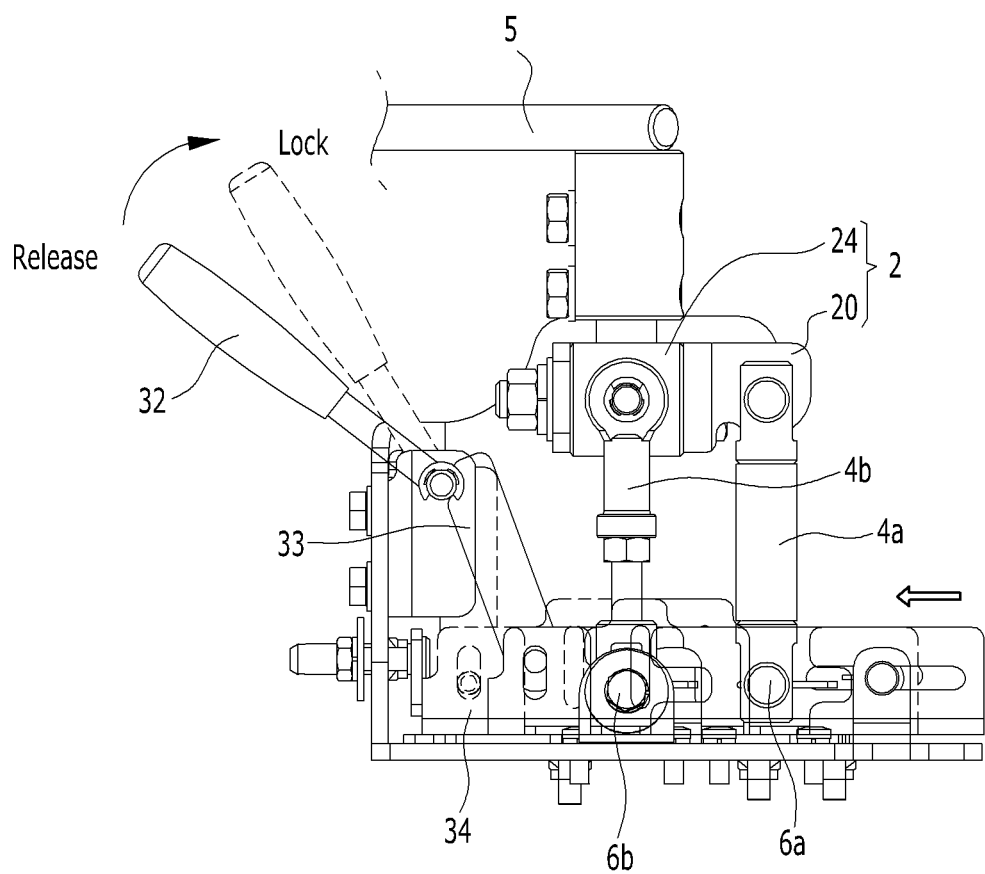
FIG. 10 is a view of an operation state of the joystick lever assembly according to the present invention when operating the locking of a lock lever.

FIG. 10 is a view of an operation state of the joystick lever assembly according to the present invention when operating the locking of a lock lever.

With reference to FIG. 10 along with FIGS. 7 and 9, when the lock lever is moved from a release position to a lock position, the operation rod 33 is rotated by the lock lever 32, and the lock member 34 connected to the operation rod 33 is moved to one side (see an arrow direction). Also, the end parts of the first stopper 6a and the second stopper 6b are coupled to the first fixing groove 35a and the second fixing groove 35b by the movement of the lock member 34.

As the first and second stoppers 6a and 6b are coupled to the first and second fixing grooves 35a and 35b, the vertical movements of both the first and second stoppers 6a and 6b and the first and second connectors 4a and 4b are simultaneously restricted. Thus, the forward/backward tilting bracket 20 and the leftward/rightward tilting shaft 24, which constitute the operation part 2, cannot move. Accordingly, the joystick lever 5 does not move by any external force in a fixed state on a neutral position.

According to the aforementioned joystick lever assembly of the present invention, the lock member, which performs a rectilinear motion by the lock lever, can completely limit the bidirectional movement of the operation part by simultaneously restricting two connectors that transfer forward, backward, leftward, and rightward rotation operating force of the lever to the hydraulic valves. In other words, since the forward, backward, leftward, and rightward movements of the operation part are simultaneously restricted, locking can more be stably and completely realized.

In the past, since the forward/backward movement of an operation part is also limited by using a lock bar to restrict a leftward/rightward rotation shaft, a locked state is not stable, and a gap is generated by the tolerance between a coupling hole and a protrusion. According to the present invention, however, the generation of a gap can be minimized in a locked state because each of the forward, backward, leftward, and rightward movements of an operation part is simultaneously or separately restricted by a lock member.

In the aforementioned detailed descriptions of the present invention, only specific embodiments have been described. However, the present invention should not be considered as being limited to specific forms mentioned in the detailed descriptions, but should rather be considered as including various modifications, additions and substitutions within the scope and spirit of the present invention as disclosed in the accompanying claims.

What is claimed is:

1. A joystick lever assembly that enables simultaneous or separate operation of two hydraulic valves with different functions, the joystick lever assembly comprising:

a base part including a floor plate, a first side plate vertically connected to one side part of the floor plate, and a second side plate vertically connected to another side part of the floor plate and perpendicularly connected to the first side plate;

an operation part that is connected to the first side plate of the base part and includes rotary elements rotated with respect to each of forward/backward and leftward/rightward directions by a joystick lever, and to which the joystick lever is connected;

a first connector connected to one side of the operation part so as to transfer rotation operating force of the forward/backward direction of the operation part to an operation terminal of one hydraulic valve;

a second connector connected to a central part of the operation part so as to transfer rotation operating force of the leftward/rightward direction of the operation part to an operation terminal of another hydraulic valve;

a lock part including a lock lever unit mounted on the second side plate of the base part to enable a rotary motion in the forward/backward direction, and a lock member that performs a rectilinear motion on the floor plate according to the rotary motion of the lock lever unit; and a first stopper and a second stopper coupled to bottoms of the first connector and the second connector, respectively, toward the lock member, wherein the forward/backward direction is defined as a rotation direction of the lock lever unit, and the leftward/rightward direction is defined as a direction horizontally orthogonal to the rotation direction of the lock lever unit, wherein a first fixing groove and a second fixing groove that is in a slit form whose one side is opened are provided on one side surface of the lock member to correspond to the first and second stoppers, respectively, wherein the first stopper and the second stopper are inserted into the first fixing groove and the second fixing groove according to the rectilinear motion of the lock member so as to restrict a movement of the operation part in a biaxial direction, and wherein the lock lever unit and the lock member of the lock part are connected by a pin, and an elongated hole into which the pin is inserted is provided on one side of the lock member to correspond to the pin moved along a specific circular arc trace by the rotary motion of the lock lever unit.

2. The joystick lever assembly according to claim 1, wherein the operation part includes:
 a forward/backward tilting bracket mounted on the first side plate to be rotatable in the forward/backward direction, wherein one end of the first connector is hingedly coupled to one end part; and
 a leftward/rightward tilting shaft hingedly coupled to the forward/backward tilting bracket in the leftward/rightward direction, wherein a connection shaft to which the joystick lever is connected and an operation shaft to which one end of the second connector is ball-jointed are provided on an exterior surface of the leftward/rightward tilting shaft.

3. The joystick lever assembly according to claim 2, wherein a concave mounting part whose size corresponds to that of the leftward/rightward tilting shaft is provided on the forward/backward tilting bracket, the forward/backward tilting bracket being hingedly coupled to the concave mounting part to be rotatable in the leftward/rightward direction.

4. The joystick lever assembly according to claim 1, wherein the lock lever unit includes:
 a lock lever bracket mounted on the second side plate of the base part;
 a lock lever, wherein a handle grip is provided on a top, and a hinge shaft connected to the lock lever bracket is provided on a bottom; and
 an operation rod that is attached to the hinge shaft of the lock lever and is connected to the lock member by being extended in a direction toward the lock member.

5. The joystick lever assembly according to claim 1, wherein the lock lever unit includes:
 a lock lever bracket mounted on the second side plate of the base part;
 a lock lever, wherein a handle grip is provided on a top, and a hinge shaft connected to the lock lever bracket is provided on a bottom; and
 an operation rod that is attached to the hinge shaft of the lock lever and is connected to the lock member by being extended in a direction toward the lock member.

6. The joystick lever assembly according to claim 1, further comprising:
 a guide member coupled to a front end of the lock member, and inserted into a guide hole formed on the second side plate of the base part to guide the rectilinear motion of the lock member.

7. The joystick lever assembly according to claim 6, further comprising:
 a friction reducing plate provided between the lock member and the floor plate of the base part.

8. The joystick lever assembly according to claim 7, wherein at least one side surface supporting plate is provided on the friction reducing plate to face a part of one side surface of the lock member, a slot is provided on one side of the lock member to correspond to the side surface supporting plate, and the rectilinear motion of the lock member is stably performed with respect to the friction reducing plate by a guide pin that is coupled to the side surface supporting plate and is inserted into the slot.

9. The joystick lever assembly according to claim 1, further comprising:
 a friction reducing plate provided between the lock member and the floor plate of the base part.

10. The joystick lever assembly according to claim 9, wherein at least one side surface supporting plate is provided on the friction reducing plate to face a part of one side surface of the lock member, a slot is provided on one side of the lock member to correspond to the side surface supporting plate, and the rectilinear motion of the lock member is stably performed with respect to the friction reducing plate by a guide pin that is coupled to the side surface supporting plate and is inserted into the slot.

* * * * *